H. DECK.
GRASS CATCHING DEVICE FOR LAWN MOWERS.
APPLICATION FILED JULY 7, 1908.
959,723.
Patented May 31, 1910.
2 SHEETS—SHEET 2.
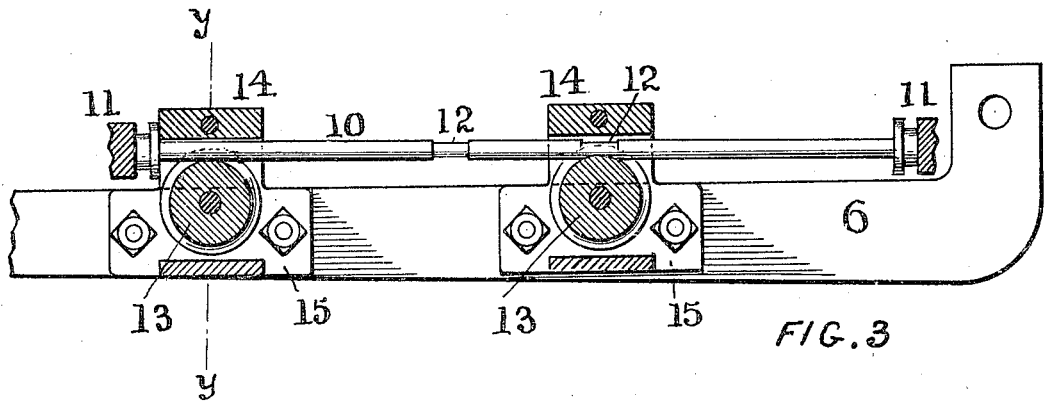
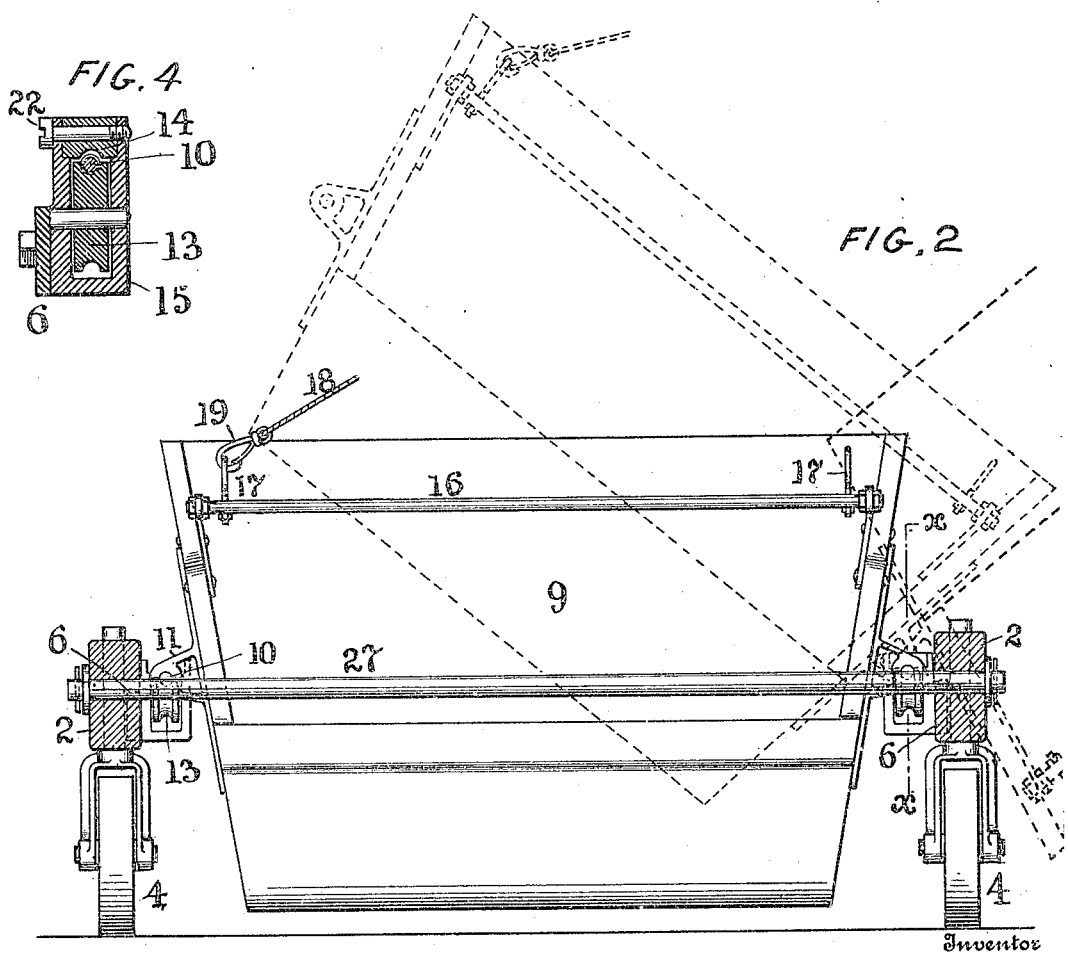

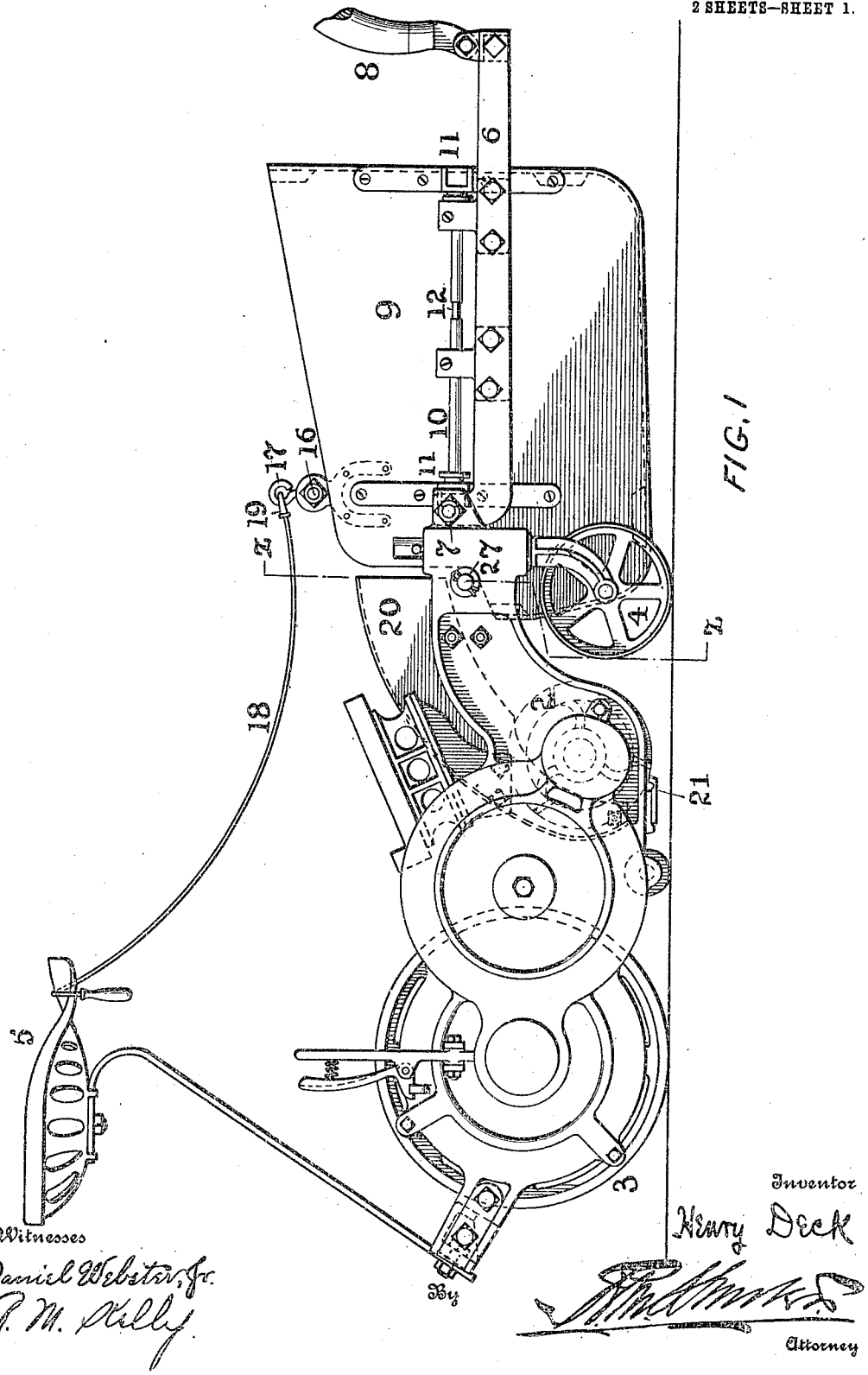

UNITED STATES PATENT OFFICE.

HENRY DECK, OF PHILADELPHIA, PENNSYLVANIA, ASSIGNOR TO JOHN F. BRAUN AND WILLIAM P. M. BRAUN, COPARTNERS TRADING AS JOHN BRAUN & SONS, OF PHILADELPHIA, PENNSYLVANIA.

GRASS-CATCHING DEVICE FOR LAWN-MOWERS.

959,723. Specification of Letters Patent. Patented May 31, 1910.

Application filed July 7, 1908. Serial No. 442,352.

*To all whom it may concern:*

Be it known that I, HENRY DECK, a citizen of the United States, and resident of the city and county of Philadelphia, State of Pennsylvania, have invented an Improvement in Grass-Catching Devices for Lawn-Mowers, of which the following is a specification.

My invention has reference to grass catching devices for lawn mowers and consists of certain improvements which are fully set forth in the following specification and shown in the accompanying drawings which form a part thereof.

The object of my invention is to provide a lawn mower with suitable means for catching and collecting the cut grass as it leaves the cutter, and by which it may be dumped at intervals to the side and out of the path of travel of the machine.

My invention consists in providing the lawn mower with a support for a grass receiving box, and combining therewith the said box by means of a sliding connection by which it will permit the box to be shifted forward out of the way of the running gear or other obstructing parts of the machine and then tilted laterally to discharge its contents, and subsequently be returned into its primary position close to the cutter devices.

My invention also consists in the above construction when so made that it may be adjusted to discharge to either side of the machine as preferred, and be operated by the driver at a distance.

My invention also comprehends details of construction which, together with the features above specified will be better understood by reference to the drawings in which:—

Figure 1 is a side elevation of a lawn mower having my invention applied thereto; Fig. 2 is a cross sectional elevation of the same on line z—z of Fig. 1; Fig. 3 is a sectional elevation of a part of the supporting and guiding means for the grass receiving box taken on line x—x of Fig. 2; and Fig. 4 is a cross section of Fig. 3 on line y—y.

2 is the lawn mower proper and is shown as a horse-power mower, the shafts 8 being indicated as connected to the forward end of forwardly extending bars 6 which are bolted at 7 to the front of the main frame of the lawn mower proper.

3 indicates the driving wheels of the lawn mower; and 4 are the forward swiveling supporting or caster wheels, which are adapted to adjust themselves to permit the lawn mower to be pulled or guided over the grass in any direction under the control of the driver.

5 is the driver's seat, which is conveniently arranged above the lawn mower proper.

The general construction of the lawn mower may be made in any suitable manner and embody the general constructions of any lawn mower heretofore, or now in use.

9 is the grass receiving box and is provided on each side with a horizontal rod 10, secured by brackets 11 to the sides of the grass box. The box is arranged between the two forward supports 6 connecting the lawn mower proper with the shafts; and the side guide rods 10 rest upon and are guided by grooved rollers 13 journaled in brackets 15 which are bolted to the side frames 6. Retaining blocks 14 may be secured in the brackets 15 above the rods 10 by means of screws 22. The rods 10 are also provided with grooved parts 12 which are adapted to engage the rollers 13 when the box 9 is shifted into the rear position as indicated in Fig. 1 or into the forward position toward the shafts 8 when the contents is to be dumped. These grooved portions 12 act as means for temporarily retaining the box in its adjusted positions. When the box is in the position shown in Fig. 1, namely, for normal use when the machine is being employed to cut the grass, the rear part extends backward between the caster wheels 4 and forward portion of the lawn mower proper, the lower rear portion of the box extending under and backward of the transverse rod 27 extending across the lawn mower. In this manner the rear or open end of the box is brought near the revolving cutter, which is immediately above and coöperates with the stationary cutter 21. As the grass is cut by the revolving and stationary cutters, it is thrown upward and is guided forward by a sheet metal guide 20 which is secured to the machine, the forward end of the said guide extending over the rear lower part of the box 9. Extending across the box 9 is a rod 16 which has at each side of the box a loop 17 with either of which the snap hook 19 on the end of the cable 18 may be engaged and by which cable the operator may tilt the box as indicated by the dotted lines in Fig. 2.

While there are guide wheels 13 and brackets 15 upon each side of the machine, only one set of the said brackets have at one time the retaining blocks 14, the said blocks being on the side of the machine about which the grass box is to tilt. For example in Fig. 2 they would be and are so shown as at the right side, whereas at the left side the brackets are open at the top so that the guide rod 10 at that side of the grass box may rise up from the guiding wheels, or be received by them without obstruction. If the dumping is to be to the opposite side of the machine, the retaining blocks 14 will be transferred to the brackets 15 upon that side.

When the grass box is substantially filled, it is pushed forward upon the supporting wheels until the rear end is clear of the transverse bolt 27 and any other obstructing part of the lawn mower proper and then by means of the cable 18 the box may be tilted over, as indicated in dotted lines in Fig. 2, to completely discharge the contents. The box is then returned to its normal position and pulled backward into the position indicated in Fig. 1. It is important that the box be supported so as to be capable of being moved backward as far as possible toward the cutters so as to insure all of the cut grass being received by the box even when the machine is propelled at a slow speed, but to accomplish this it is necessary to give to the box capacity for being shifted longitudinally of the machine before being tilted, and my invention is particularly directed to this feature of the apparatus.

While I have shown the two grooved parts 12 of the guide rods 10 as being intended to coöperate respectively with the different supporting wheels 13, it is evident that by properly locating such grooved portions on the rods they may be made to coöperate with the same grooved wheel, this difference being immaterial to the actual results. It is also to be understood that while I have indicated the grooved rods as a means for retaining the grass box in its extreme shifted position, any other means for so retaining the box may be employed in lieu of such construction.

The box is shown as being composed of wooden sides with a sheet metal front, bottom and rear part, but this construction may be varied if so desired, and said box may be made entirely of metal or of wood as preferred.

In the construction shown, the side frames 6 are indicated as detachable from the lawn mower proper, and it is preferable that the construction be such that, if desired, the shafts 8 may be directly hinged at 7 to the lawn mower proper in uses where it is not desired to employ the grass receiving box, in which case the said side frame 6, together with the box, may be removed and the shafts 8 hinged directly at 7 to the lawn mower.

While I prefer the construction shown as being excellently adapted for the purposes of my invention, I do not limit myself to the details as they may be modified without departing from the spirit of the invention.

Having now described my invention, what I claim as new and desire to secure by Letters Patent, is:—

1. A lawn mower having a support at its forward part combined with a grass receiving box adjustably sustained by the support so as to be movable to and from the cutter of the lawn mower and also so as to tilt to one side of the support to dump the grass.

2. A lawn mower having a support at its forward part, combined with an adjustable grass box, guides upon the sides of the box for sustaining and pivoting the box upon the support, and wheels on the support upon which the guides travel and rock.

3. A lawn mower having a support at its forward part, combined with an adjustable grass box, guides upon the sides of the box for sustaining and pivoting the box upon the support, wheels on the support upon which the guides travel and rock, brackets secured to the support and in which the wheels are journaled, and detachable means for the brackets to lock the guide at either side of the box in hinged position upon the wheels.

4. A lawn mower having a support at its forward part, combined with an adjustable grass box, guides upon the sides of the box for sustaining and pivoting the box upon the support, wheels on the support upon which the guides travel and rock, and means extending from the cutters to guide the cut grass into the box.

5. A lawn mower having a frame formed with a forward transverse portion and a revolving cutter, combined with a grass receiving box longer at the bottom than at the top to extend under the forward transverse portion of the frame, and means upon and in front of the lawn mower frame arranged for supporting the box so that it may be shifted horizontally toward or from the revolving cutter and the transverse portion of the frame, said means providing a clear unobstructed space in front of the box equal at least to the distance to which the box extends under the forward transverse frame toward the cutter.

6. A lawn mower having revolving cutters, combined with a grass receiving box in front of the cutters, means for supporting the box upon the lawn mower so that it may be shifted toward or from the cutters, and means whereby the box may be retained in either of its extreme positions of adjustment.

7. A lawn mower having a frame formed with a forward transverse portion and a revolving cutter, combined with a grass receiving box longer at the bottom than at the top to extend under the forward transverse portion of the frame, means upon and in front of the lawn mower frame arranged for supporting the box so that it may be shifted horizontally toward or from the revolving cutter and the transverse portion of the frame, said means providing a clear unobstructed space in front of the box equal at least to the distance to which the box extends under the forward transverse frame toward the cutter, and guiding means on the lawn mower extending over the rear lower part of the grass receiving box for guiding the cut grass from the cutter into the box beyond its rear edge.

8. A lawn mower, combined with a grass receiving box hinged to the lawn mower so that it may be tilted laterally, and means for guiding and permitting the box to be adjusted to and from the cutters of the lawn mower.

9. A lawn mower, combined with a grass receiving box hinged to the lawn mower so that it may be tilted laterally, a transverse rod 16 across the rear end of the grass box and having a loop 17, and flexible means connecting with the loop for operating the box at a distance, and means for guiding and permitting the box to be adjusted to and from the cutters of the lawn mower.

10. A lawn mower, combined with two front supports 6 having guide wheels 13, a grass receiving box 9 having side guide rods 10 resting upon the guide wheels, and means for holding one of the side guide rods in close operative position with the guide wheels of one support so as to constitute a hinge and at the same time permit longitudinal shifting of the box relatively to the supports.

11. A lawn mower, combined with two front supports 6 having guide wheels 13, a grass receiving box 9 having side guide rods 10 resting upon the guide wheels and having grooved portions as at 12 for frictionally locking upon the guide wheels, and means for holding one of the side guide rods in close operative position with the guide wheels of one support so as to constitute a hinge and at the same time permit longitudinal shifting of the box relatively to the supports.

12. A lawn mower having revolving cutters, combined with a grass receiving receptacle, and supporting means for adjusting the receptacle toward and from the front of the lawn mower in advance of the cutters and also so constructed that the receptacle may be tilted laterally to dump its contents when in its adjusted position in advance of the lawn mower.

13. In a lawn mower having revolving cutters and a frame extending forward of the cutters, combined with a grass receiving box in front of the cutters and adjustably supported upon the frame so as to be adjusted toward or from the cutters, and also arranged to be tilted laterally upon the frame for discharging the contents of the box when adjusted away from the cutters, and means for retaining the box in its adjusted position nearest to the cutters.

In testimony of which invention, I have hereunto set my hand.

HENRY DECK.

Witnesses:
 ALBERT E. MILLER,
 JESSE GILBERT.